US010965962B2

(12) United States Patent
Hu et al.

(10) Patent No.: US 10,965,962 B2
(45) Date of Patent: *Mar. 30, 2021

(54) REAL-TIME AND SECURED PICTURE/VIDEO UPLOAD VIA A CONTENT DELIVERY NETWORK

(71) Applicant: AT & T Intellectual Property I, L.P., Atlanta, GA (US)

(72) Inventors: Weidong Hu, Austin, TX (US); Bernard Ku, Austin, TX (US); Cameron Coursey, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,610

(22) Filed: Jun. 26, 2019

(65) Prior Publication Data

US 2019/0318062 A1    Oct. 17, 2019

Related U.S. Application Data

(63) Continuation of application No. 15/079,609, filed on Mar. 24, 2016, now Pat. No. 10,339,277, which is a
(Continued)

(51) Int. Cl.
| | | |
|---|---|---|
| *H04L 29/08* | (2006.01) | |
| *H04N 21/218* | (2011.01) | |
| *G06F 21/10* | (2013.01) | |
| *H04L 29/06* | (2006.01) | |
| *H04W 12/04* | (2021.01) | |
| *H04N 21/222* | (2011.01) | |
| *H04N 21/2743* | (2011.01) | |
| *H04N 21/61* | (2011.01) | |
| *H04N 21/4788* | (2011.01) | |

(52) U.S. Cl.
CPC ....... *H04N 21/21805* (2013.01); *G06F 21/10* (2013.01); *H04L 63/123* (2013.01); *H04N 21/222* (2013.01); *H04N 21/2743* (2013.01); *H04N 21/4788* (2013.01); *H04N 21/6125* (2013.01); *H04N 21/6175* (2013.01); *H04W 12/04* (2013.01); *G06F 2221/0753* (2013.01)

(58) Field of Classification Search
CPC . H04N 21/21805; H04N 21/22; H04L 63/123
See application file for complete search history.

(56) References Cited

U.S. PATENT DOCUMENTS

| | | |
|---|---|---|
| 5,806,005 A | 9/1998 | Hull |
| 6,535,243 B1 | 3/2003 | Tullis et al. |

(Continued)

*Primary Examiner* — Adnan M Mirza
(74) *Attorney, Agent, or Firm* — Guntin & Gust, PLC; Dana Lemoine

(57) ABSTRACT

A content delivery network includes an overlay network having a plurality of cache servers. Each cache server configured to receive a request from a personal content server to register with the content delivery network, receive a request from a mobile capture device to establish communication with the personal content server, and establish a communication path through the overlay network between the mobile capture device and the personal content server. Each cache server is further configured to transfer content from the mobile capture device along the communication path to the personal content server.

20 Claims, 5 Drawing Sheets

Related U.S. Application Data continuation of application No. 12/553,771, filed on Sep. 3, 2009, now Pat. No. 9,338,515.

(56) References Cited

U.S. PATENT DOCUMENTS

| | | |
|---|---|---|
| 6,774,926 B1 | 8/2004 | Ellis |
| 6,986,158 B1 | 1/2006 | Terui et al. |
| 7,068,857 B1 | 6/2006 | Touchard et al. |
| 7,117,519 B1 | 10/2006 | Anderson et al. |
| 7,124,427 B1 | 10/2006 | Esbensen et al. |
| 7,394,966 B1 | 7/2008 | Wada et al. |
| 7,426,750 B2 | 9/2008 | Cooper et al. |
| 7,907,213 B1 | 3/2011 | Biere et al. |
| 7,995,756 B1 | 8/2011 | McKinney et al. |
| 8,180,904 B1 | 5/2012 | Albanese et al. |
| 8,875,208 B1 | 10/2014 | Abkairov et al. |
| 2002/0013852 A1 | 1/2002 | Janik et al. |
| 2002/0116715 A1 | 8/2002 | Apostolopoulos et al. |
| 2003/0079008 A1 | 4/2003 | Fujii et al. |
| 2003/0110503 A1 | 6/2003 | Perkes et al. |
| 2003/0118107 A1 | 6/2003 | Itakura et al. |
| 2003/0135468 A1 | 7/2003 | Barbir et al. |
| 2003/0138050 A1 | 7/2003 | Yamada et al. |
| 2003/0200337 A1 | 10/2003 | Jabri et al. |
| 2004/0117836 A1 | 6/2004 | Karaoguz et al. |
| 2004/0139088 A1 | 7/2004 | Mandato |
| 2005/0021726 A1 | 1/2005 | Denoual et al. |
| 2005/0132264 A1 | 6/2005 | Joshi et al. |
| 2005/0228897 A1 | 10/2005 | Yamamoto et al. |
| 2005/0246757 A1 | 11/2005 | Relan et al. |
| 2005/0283818 A1 | 12/2005 | Zimmermann et al. |
| 2006/0009155 A1 | 1/2006 | Paalasmaa et al. |
| 2006/0028991 A1 | 2/2006 | Tan et al. |
| 2006/0085823 A1 | 4/2006 | Bell et al. |
| 2006/0123010 A1 | 6/2006 | Landry et al. |
| 2006/0159109 A1 | 7/2006 | Lamkin et al. |
| 2006/0259589 A1 | 11/2006 | Lerman et al. |
| 2006/0271977 A1 | 11/2006 | Lerman et al. |
| 2007/0043829 A1 | 2/2007 | Dua et al. |
| 2007/0067104 A1 | 3/2007 | Mays et al. |
| 2007/0078768 A1 | 4/2007 | Dawson |
| 2007/0220575 A1 | 9/2007 | Cooper et al. |
| 2007/0276925 A1 | 11/2007 | La Joie et al. |
| 2007/0288651 A1 | 12/2007 | Nassor et al. |
| 2008/0060032 A1 | 3/2008 | Toutenhoofd et al. |
| 2008/0063003 A1 | 3/2008 | O'Neal et al. |
| 2008/0092181 A1 | 4/2008 | Britt et al. |
| 2008/0162623 A1 | 7/2008 | Flynn et al. |
| 2008/0207182 A1 | 8/2008 | Maharajh et al. |
| 2008/0209491 A1 | 8/2008 | Hasek et al. |
| 2008/0215711 A1 | 9/2008 | Shitrit et al. |
| 2009/0029644 A1 | 1/2009 | Sue et al. |
| 2009/0031250 A1 | 1/2009 | Boudreau et al. |
| 2009/0037734 A1 | 2/2009 | Kito et al. |
| 2009/0112899 A1 | 4/2009 | Johnson et al. |
| 2009/0113472 A1 | 4/2009 | Sheth |
| 2009/0157869 A1 | 6/2009 | Cleary |
| 2009/0217359 A1 | 8/2009 | Kikkawa et al. |
| 2009/0288122 A1 | 11/2009 | Zellner et al. |
| 2009/0327390 A1 | 12/2009 | Tran et al. |
| 2009/0328109 A1 | 12/2009 | Pavlovskaia et al. |
| 2010/0031299 A1 | 2/2010 | Harrang et al. |
| 2010/0083362 A1 | 4/2010 | Francisco |
| 2010/0088292 A1 | 4/2010 | Tirpak et al. |
| 2010/0088750 A1 | 4/2010 | Okamoto et al. |
| 2010/0169808 A1 | 7/2010 | Yu et al. |
| 2011/0193973 A1 | 8/2011 | Motoki et al. |
| 2011/0197237 A1 | 8/2011 | Turner |
| 2012/0023522 A1 | 1/2012 | Anderson et al. |
| 2012/0039510 A1 | 2/2012 | Julia et al. |
| 2012/0096513 A1 | 4/2012 | Raleigh et al. |
| 2012/0233644 A1 | 9/2012 | Rao |
| 2013/0013800 A1 | 1/2013 | Brueck et al. |
| 2015/0181415 A1 | 6/2015 | Raleigh et al. |

REAL-TIME AND SECURED PICTURE/VIDEO UPLOAD VIA A CONTENT DELIVERY NETWORK

CROSS-REFERENCE TO RELATED APPLICATION(S)

This application is a continuation of U.S. patent application Ser. No. 15/079,609 filed Mar. 24, 2016, which is a continuation of U.S. patent application Ser. No. 12/553,771 filed Sep. 3, 2009, now U.S. Pat. No. 9,338,515. All sections of the aforementioned application(s) are incorporated herein by reference in their entireties.

FIELD OF THE DISCLOSURE

The present disclosure generally relates to communications networks, and more particularly relates to real-time and secured picture/video upload via a content delivery network.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
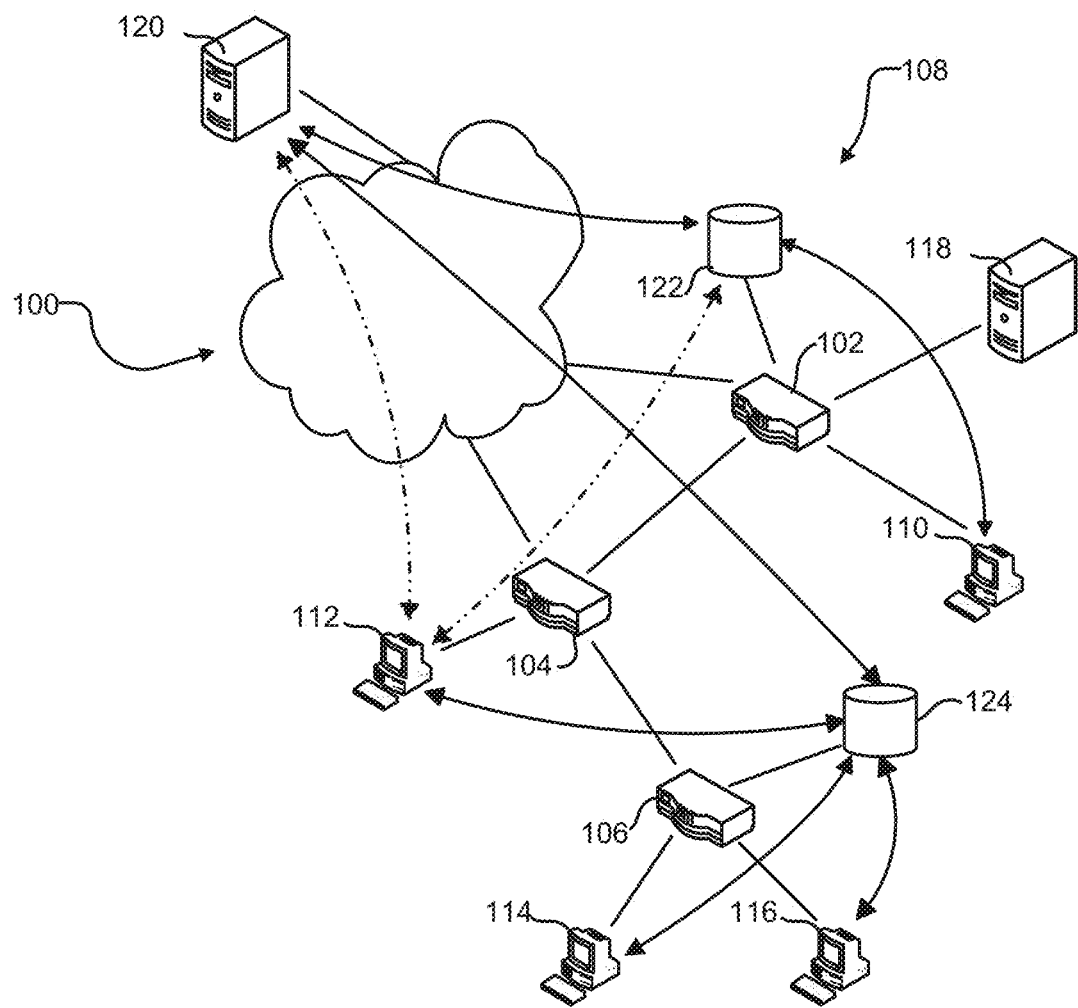
FIG. 1 is a block diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110 through 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

In an embodiment, cache servers 122 and 124 can form an overlay network. The overlay network can be used to efficiently route CDN traffic through the network. For example, when the link between router 104 and network 100 is overloaded, the overlay network can route traffic between content server 120 and cache server 124 through cache server 122 to avoid the congested link between router 104 and network 100. In contrast, without the overlay network, traffic from content server 120 to cache server 124 may attempt to travel across the congested link between router 104 and network 100 based on the least cost routing policies used by the network, thereby reducing throughput and increasing the time required to provide content to client systems 114 and 116.

Figure 2:
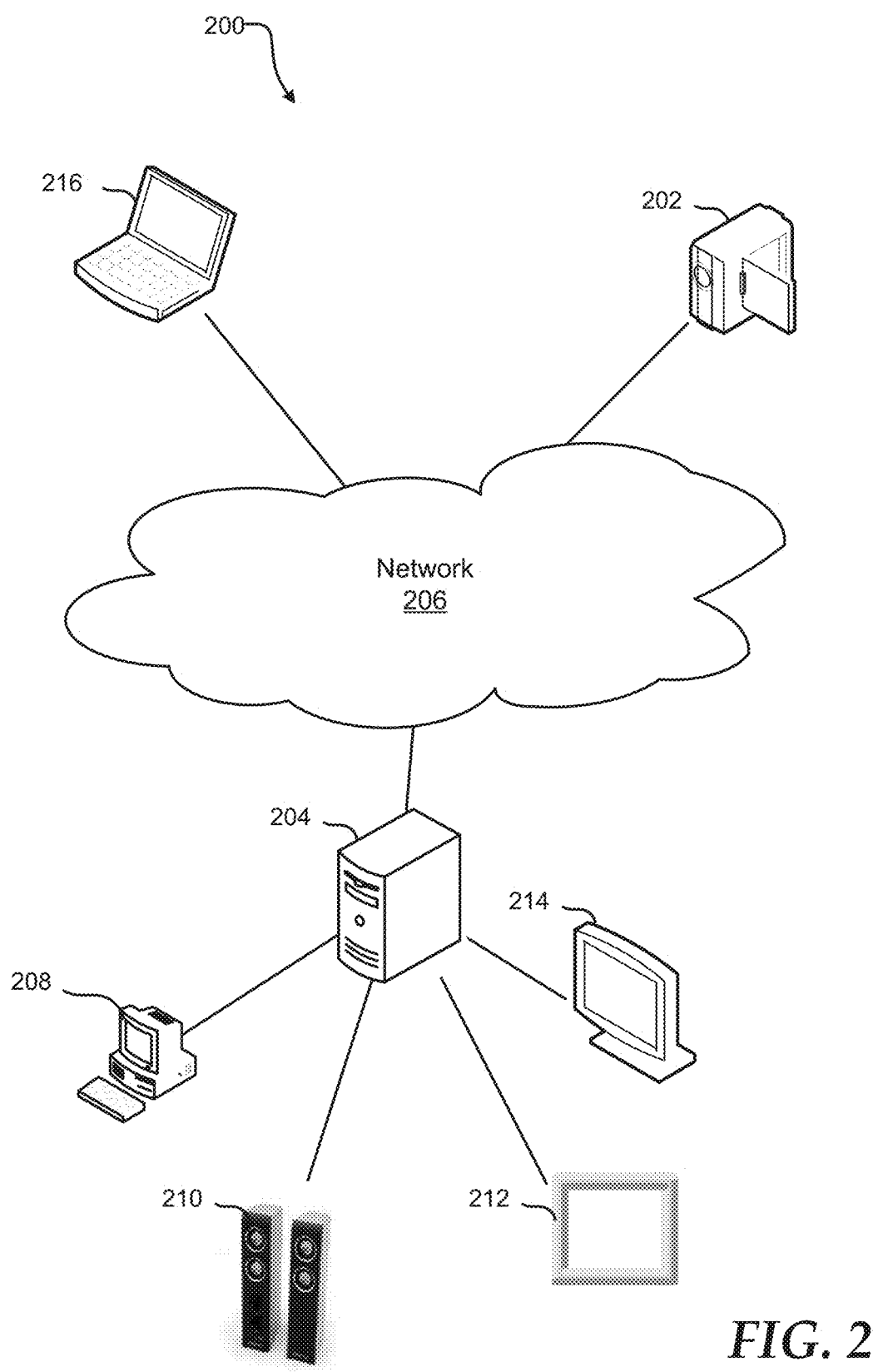
FIG. 2 is a block diagram illustrating an exemplary system for content upload in accordance with an embodiment of the present disclosure.

FIG. 2 illustrates an exemplary system, generally designated 200, for real-time and secured picture/video upload. Mobile Capture Device 202 can capture content and provide the content to Personal Content Server 204 through network 206. Mobile Capture Device 202 can be a digital camera, a digital video camera, an audio recorder, a smart phone, or other portable device capable of capturing audio and/or video content and communicating the content using network 206. Network 206 can be a cellular network, an IP network, a CDN, or the like. In a particular embodiment, cache servers such as cache servers 122 and 124 can form an overlay network to efficiently route traffic between Mobile Capture Device 202 and Personal Content Server 204. Mobile Capture Device 202 can communicate with the network 206 using a cellular communications protocol such as Enhanced Data rates for GSM Evolution (EDGE), Universal Mobile Telecommunications System (UMTS), Code division multiple access (CDMA), Long Term Evolution (LTE), Worldwide Interoperability for Microwave Access (WiMAX), and the like or using a wireless local area network (WLAN) communications protocol such as 802.11a, 802.11b, 802.11g, 802.11n, and the like. Similarly, the Personal Content Server 204 can communicate with the network 206 using a cellular communications protocol. Alternatively, the Personal Content Server 204 can be connected to a local area network that in turn is connected to the network 206.

The Personal Content Server 204 can provide content to local devices such as personal computer 208, audio system 210, digital picture frame 212, or television 214. In an embodiment, the Personal Content Server 204 can provide the content to a set-top box for display on television 214. The Personal Content Server 204 can communicate with the local devices using wired or wireless LAN technologies or short-range wireless communication technologies such as Bluetooth, wireless USB, and the like. Local devices can display or play back content received by the Personal Content Server 204 from the Mobile Capture Device 202.

In an embodiment, portable computer 216, such as a laptop, tablet, or netbook, can remotely provide content to the Personal Content Server 204. Additionally, portable computer 216 can remotely access content stored by the Personal Content Server 204. Portable computer 216 can also include a smart phone, portable digital assistant (PDA), or handheld computer.

Figure 3:
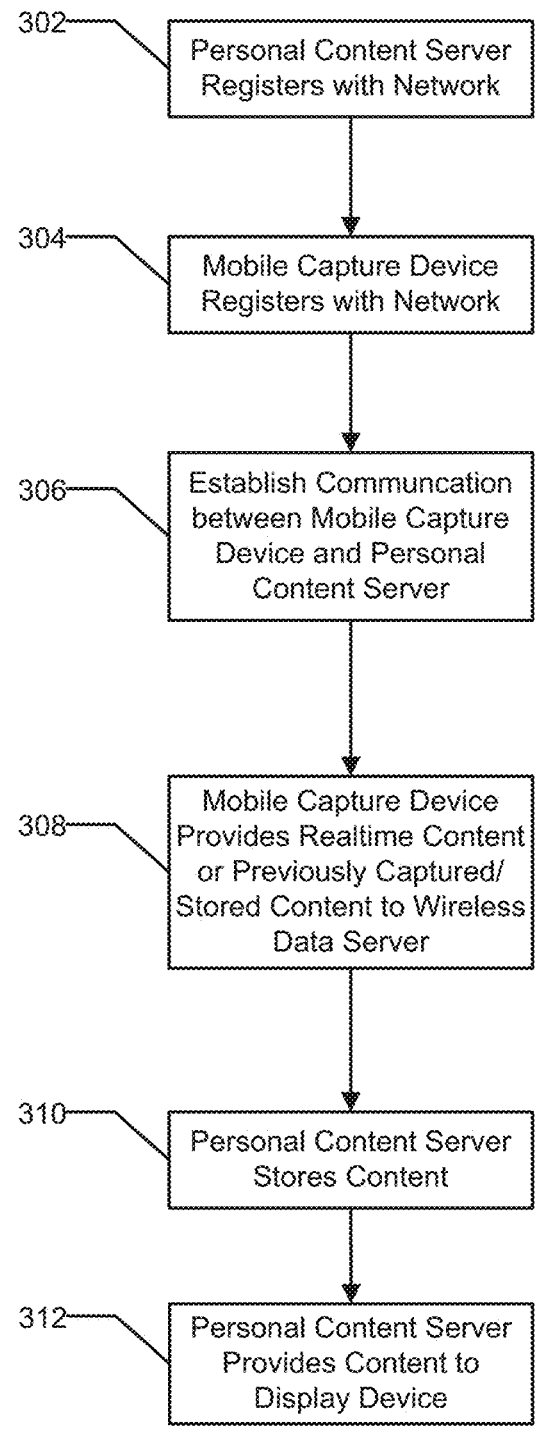
FIG. 3 is a flow diagram illustrating an exemplary method for content upload in accordance with an embodiment of the present disclosure.

FIG. 3 illustrates an exemplary method of uploading content. At 302, a personal content server, such as wireless home data server 204, can register with a network such as network 200. Registering with the network can allow remote devices to communicate with the personal content server. The personal content server can use a customer account number, a customer telephone number, an electronic serial number, or other unique identifier to register with the network. At 304, a mobile capture device, such as mobile capture device 202, can register with the network enabling the mobile capture device to communicate using the network. For example, the mobile capture device can use a mobile identification number or electronic serial number assigned to the mobile capture device to register with the network.

At 306, the mobile capture device can establish a connection to the personal content server. In an embodiment, the mobile capture device may provide a unique identifier, such as a customer account number or a Mobile Station International Subscriber Directory Number (MSISDN), to the network and the network can route communication between the mobile capture device and the personal content server. Alternatively, the network can provide the mobile capture device with an address, such as an IP address, for communication with the personal content server. Additionally, establishing communication between the mobile capture device and the personal content server can include authenticating the mobile capture device and/or the personal content server. For example, the personal content server may maintain a list of mobile capture devices authorized to provide content. Similarly, the mobile capture device may maintain a list of personal content servers. Alternatively, the mobile content device and the personal content server may have previously exchanged encryption keys ensuring that the personal content server can verify that incoming content is being provided by an authorized mobile capture device. Similarly, the encryption keys can prevent unauthorized access to the content, such as by a rouge system impersonating the personal content server.

At 308, the mobile capture device can provide content to the personal content server or broadcast to multiple personal content servers located at different locations so that the captured real-time stream of content can be watched (played) simultaneously by other family members or friends. Alternatively, the mobile capture device can upload or stream previously captured content to the personal content server. For example, the mobile capture device can capture content when network access is unavailable or when there is insufficient bandwidth for a real-time stream. When network access becomes available, the mobile capture device can provide the captured content to the personal content server. Alternatively, the mobile capture device can provide the content at a reduced rate using the available bandwidth. The mobile capture device may provide the content at a reduced rate by reducing the bit rate of audio or video content, reducing resolution of image content, or extending the amount of time required to upload the content.

At 310, the personal content server can receive the content from the mobile capture device and store the content for later retrieval. Additionally, at 312 the personal content server can provide the content to a playback device, such as personal computer 208, audio system 210, digital picture frame 212, or television 214.

In an embodiment, the personal content server can reformat the content for the playback device. For example, the mobile capture device such as a digital camera can provide a high-resolution image to the personal content server. The personal content server can provide the image at full resolution to a computer, at a resolution intermediate to a high-definition television, or at a low resolution to a digital picture frame.

In another embodiment, the personal content server can provide the mobile capture device with a list of capabilities of the available display devices. For example, the personal content server can provide the resolution needed for the available playback devices. Additionally, the personal content server can identify if the playback devices are video display capable, such as a television, or are limited to picture display, such as a digital picture frame. The mobile capture device can use the list of capabilities to format the content and/or prioritize the transfer of the content to the personal content server when bandwidth is limited.

Figure 4:
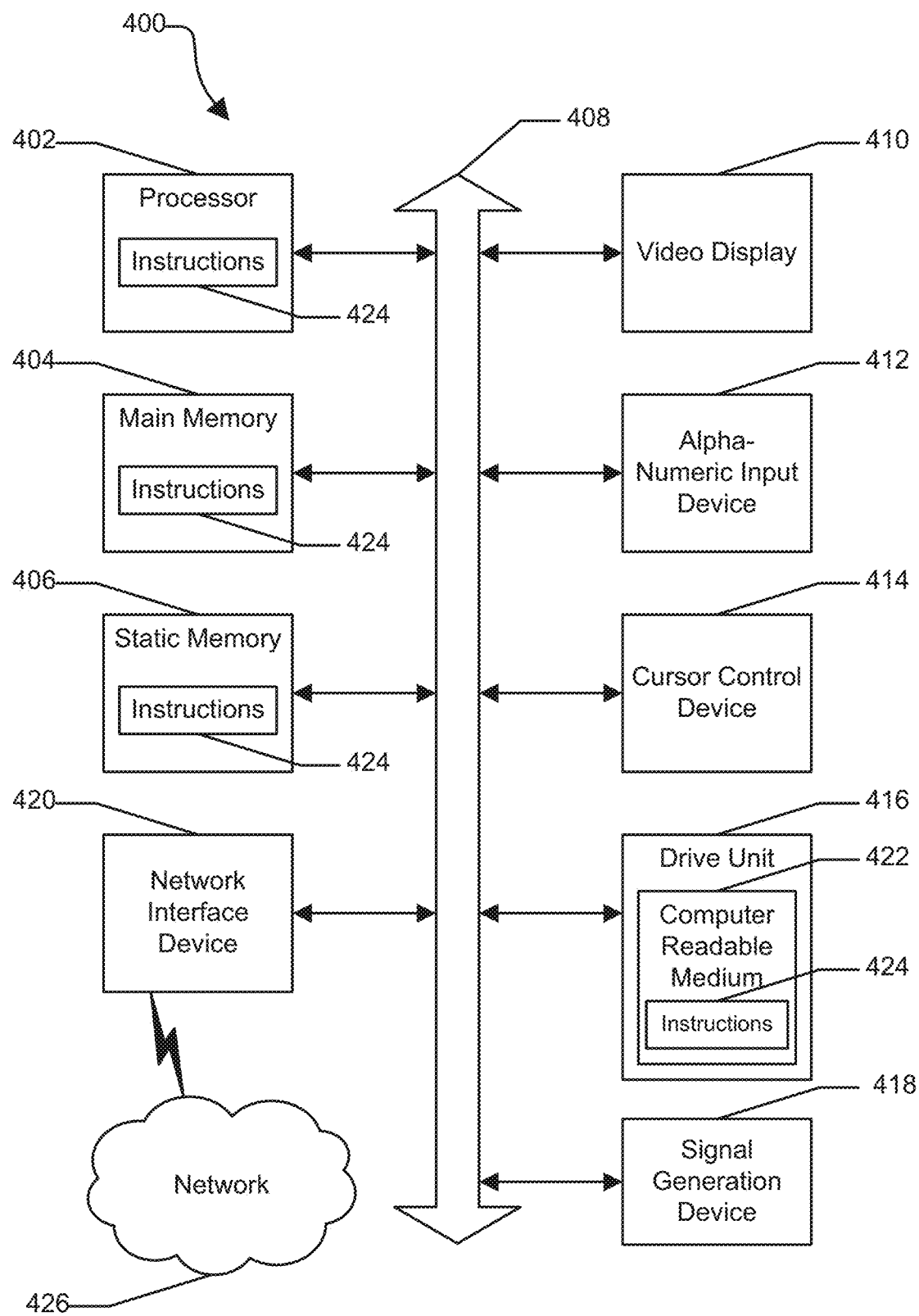
FIG. 4 is an illustrative embodiment of a general computer system.

FIG. 4 shows an illustrative embodiment of a general computer system 400. The computer system 400 can include a set of instructions that can be executed to cause the computer system to perform any one or more of the methods or computer based functions disclosed herein. The computer system 400 may operate as a standalone device or may be connected, such as by using a network, to other computer systems or peripheral devices. Examples of the general computer system can include personal content server 204, cache server 122, client system 112, router 104, content server 120, portable computer 216, and the like.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410 such as a liquid crystal display (LCD), an organic light emitting diode (OLED), a flat panel display, a solid-state display, or a cathode ray tube (CRT). Additionally, the computer system 400 may include an input device 412 such as a keyboard, and a cursor control device 414 such as a mouse. Alternatively, input device 412 and cursor control device 414 can be combined in a touchpad or touch sensitive screen. The computer system 400 can also include a disk drive unit 416, a signal generation device 418 such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

Figure 5:
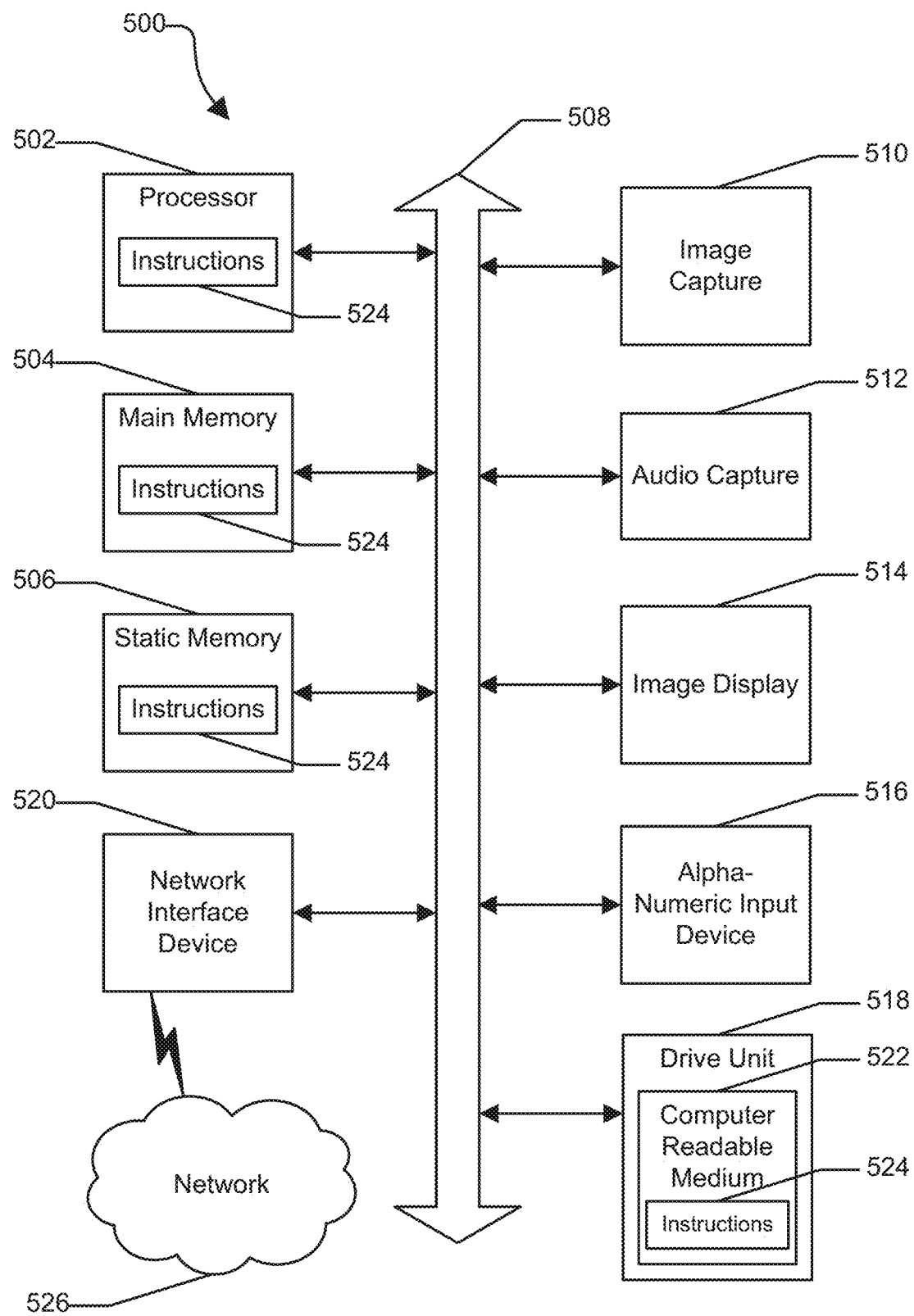
FIG. 5 is an illustrative embodiment of a content capture device.

FIG. 5 shows an illustrative embodiment of a mobile capture device 500, such as mobile capture device 202. The mobile capture device 500 can include a set of instructions that can be executed to cause the mobile capture device to perform any one or more of the methods or functions disclosed herein. The mobile capture device 500 may operate as a standalone device or may be connected, such as by using a network, to other computer systems or peripheral devices.

The mobile capture device 500 can also be implemented as or incorporated into various devices, such as a tablet PC, a personal digital assistant (PDA), a mobile device, a palmtop computer, a laptop computer, a desktop computer, a communications device, a wireless telephone, a digital camera, a digital video camera, an audio recorder, or any other machine capable of capturing content. In a particular embodiment, the mobile capture device 500 can be implemented using electronic devices that provide voice, video or data communication.

The mobile capture device 500 may include a processor 502, such as a central processing unit (CPU), a graphics processing unit (GPU), or both. Moreover, the mobile capture device 500 can include a main memory 504 and a static memory 506 that can communicate with each other via a bus 508. The mobile capture device can include an image capture unit 510 and/or an audio capture unit 512. The image capture unit 510 and the audio capture unit 512 can operate together or separately to capture content, such as video, still images, audio, and the like. As shown, the mobile capture device 500 may further include an image display unit 514 such as a liquid crystal display (LCD), an organic light emitting diode (OLED), a flat panel display, or a solid-state display. Additionally, the mobile capture device 500 may include an input device 516 such as a keypad. Alternatively, input device 516 and image display unit 514 can be combined in a touch sensitive screen. The mobile capture device 500 can also include a drive unit 518 such as a flash storage device or optical storage device, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the mobile capture device 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. .sctn.1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
verifying, by a system including a processor, that incoming content from a device is authorized;
selectively transferring, by the system, the content from the device along a_first communication path to user equipment, wherein the first communication path is established between the device and the user equipment through an overlay network;
facilitating establishing, by the system, a second communication path through the overlay network between the mobile device and the user equipment in response to a determination that the first communication path is overloaded; and
transferring, by the system, the content from the mobile device along the second communication path to the user equipment in response to a determination that bandwidth is limited, wherein the content from the mobile device is prioritized over other content for transfer along the second communication path to the customer premises equipment in response to the determination that the bandwidth is limited.

2. The method of claim 1, further comprising facilitating establishing, by the system, the first communication path through the overlay network.

3. The method of claim 1, further comprising exchanging an encryption key with the device.

4. The method of claim 3, further comprising preventing unauthorized access to the content using the encryption key.

5. The method of claim 1, further comprising reducing a bit rate of the content according to the bandwidth prior to transferring the content.

6. The method of claim 1, further comprising receiving a request from a server to register with a content delivery network.

7. The method of claim 6, further comprising registering the server with the content delivery network based on an identifier of the server.

8. The method of claim 1, further comprising facilitating reformatting of the content for playback on the user equipment.

9. The method of claim 1, further comprising adjusting a resolution of the content prior to transferring the content to the user equipment.

10. The method of claim 1, further comprising obtaining a list including a capability of the user equipment.

11. The method of claim 1, further comprising determining if the user equipment is video display capable.

12. The method of claim 1, further comprising generating a list of mobile capture devices authorized to provide the content.

13. A system comprising:
a processor; and
a memory that stores executable instructions that, when executed by the processor, facilitate performance of operations, comprising:
verifying that incoming content from a device is authorized;
selectively transferring the content from the device along a first communication path to user equipment, wherein the first communication path is established between the device and the user equipment through an overlay network;
facilitating establishing a second communication path through the overlay network between the mobile device and the user equipment in response to a determination that the first communication path is overloaded; and transferring the content from the mobile device along the second communication path to the user equipment in response to a determination that bandwidth is limited, wherein the content from the mobile device is prioritized over other content for transfer along the second communication path to the customer premises equipment in response to the determination that the bandwidth is limited.

14. The system of claim 1, wherein the operations further comprise obtaining an identifier from the mobile device.

15. The system of claim 1, wherein the operations further comprise providing the mobile device with an address for communication with a server.

16. The system of claim 1, wherein the operations further comprise facilitating a broadcast of the content to servers located at a plurality of different locations.

17. The system of claim 1, wherein the operations further comprise determining when network access is unavailable.

18. The system of claim 1, wherein the operations further comprise facilitating extension of an amount of time required to upload the content.

19. The system of claim 1, wherein the operations further comprise reformatting the content.

20. A non-transitory machine-readable storage medium comprising executable instructions which, responsive to being executed by a processor, facilitate performance of operations comprising:

verifying that incoming content from a device is authorized;

selectively transferring the content from the device along a first communication path to user equipment, wherein the first communication path is established between the device and the user equipment through an overlay network;

facilitating establishing a second communication path through the overlay network between the mobile device and the user equipment in response to a determination that the first communication path is overloaded; and transferring the content from the mobile device along the second communication path to the user equipment in response to a determination that bandwidth is limited, wherein the content from the mobile device is prioritized over other content for transfer along the second communication path to the customer premises equipment in response to the determination that the bandwidth is limited.

* * * * *